(12) United States Patent
Ueguri

(10) Patent No.: US 11,212,433 B2
(45) Date of Patent: Dec. 28, 2021

(54) IMAGE CAPTURE APPARATUS AND CONTROL METHOD THEREOF

(71) Applicant: CANON KABUSHIKI KAISHA, Tokyo (JP)

(72) Inventor: Toshiaki Ueguri, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/457,682

(22) Filed: Jun. 28, 2019

(65) Prior Publication Data

US 2020/0007783 A1 Jan. 2, 2020

(30) Foreign Application Priority Data

Jul. 2, 2018 (JP) .............................. JP2018-126164

(51) Int. Cl.
*H04N 5/232* (2006.01)
*H04N 5/235* (2006.01)

(52) U.S. Cl.
CPC ............... *H04N 5/232133* (2018.08); *H04N 5/232123* (2018.08); *H04N 5/2356* (2013.01)

(58) Field of Classification Search
CPC ....... H04N 5/232133; H04N 5/232123; H04N 5/232122; H04N 5/2356
See application file for complete search history.

(56) References Cited

U.S. PATENT DOCUMENTS

| | | | | |
|---|---|---|---|---|
| 2008/0259172 A1* | 10/2008 | Tamaru | .............. | H04N 5/23212 348/218.1 |
| 2010/0128163 A1* | 5/2010 | Nagasaka | ............ | H04N 5/2356 348/348 |
| 2011/0273471 A1* | 11/2011 | Nagasaka | ............ | H04N 5/2356 345/619 |
| 2012/0057786 A1* | 3/2012 | Yano | .................. | H04N 5/23212 382/170 |
| 2014/0192216 A1* | 7/2014 | Matsumoto | ........ | H04N 5/23219 348/222.1 |
| 2014/0198242 A1* | 7/2014 | Weng | ................... | H04N 5/2356 348/333.09 |
| 2014/0347532 A1* | 11/2014 | Kang | ..................... | H04N 5/351 348/294 |
| 2014/0354781 A1* | 12/2014 | Matsuyama | ....... | H04N 5/23212 348/49 |
| 2015/0103192 A1* | 4/2015 | Venkatraman | ............ | G06T 7/00 348/208.5 |

(Continued)

FOREIGN PATENT DOCUMENTS

JP 09-135812 A 5/1997
JP 5278564 B2 9/2013

*Primary Examiner* — Abdelaaziz Tissire
(74) *Attorney, Agent, or Firm* — Canon U.S.A., Inc. IP Division

(57) ABSTRACT

A method of an apparatus includes detecting a focusing state based on an output from a sensor, setting a step width of a focus position, and controlling to perform a plurality of times of image capturing based on a result of focus detection by the detecting and the set step width by the setting. In the setting, a step width from an in-focus position based on the result of focus detection by the detecting toward an infinity side is set to a value different from a step width from the in-focus position based on the result of focus detection by the detecting toward a closest side.

6 Claims, 12 Drawing Sheets

(56) References Cited

U.S. PATENT DOCUMENTS

| | | | |
|---|---|---|---|
| 2016/0028948 A1* | 1/2016 | Omori | H04N 5/2356 |
| | | | 348/239 |
| 2016/0119534 A1* | 4/2016 | Han | H04N 5/23212 |
| | | | 348/345 |
| 2016/0142618 A1* | 5/2016 | Tokui | G03B 13/36 |
| | | | 348/349 |
| 2017/0064190 A1* | 3/2017 | Tamaki | H04N 5/23212 |
| 2017/0244887 A1* | 8/2017 | Shibagami | G02B 7/102 |
| 2018/0084192 A1* | 3/2018 | Suzuki | H04N 5/265 |

\* cited by examiner

FIG. 8A

| 704 | IMAGE CAPTURING SETTING | |
|---|---|---|
| FOCUS BRACKET SHOOTING | | ON |

| 712 | FOCUS BRACKET SHOOTING | | |
|---|---|---|---|
| 714 | FOCUS BRACKET SHOOTING | | YES |
| 716 | THE NUMBER OF TIMES OF IMAGE CAPTURING | 720 | 100 |
| 718 | STEP WIDTH | | 4 |

FIG. 8C

| FOCUS BRACKET SHOOTING | |
|---|---|
| FOCUS BRACKET SHOOTING | YES |
| 732 | NO |

FIG. 8D

THE NUMBER OF TIMES OF IMAGE CAPTURING 750  744  746
742 — [ 1 ][ 0 ][ 0 ]
     ▽ 748

[ OK ]   [ CANCEL ]
 752       754

FIG. 8E

STEP WIDTH

△ 764
762 — [ 4 ]
▽ 766

[ OK ]   [ CANCEL ]
 768       770

IMAGE CAPTURE APPARATUS AND CONTROL METHOD THEREOF

BACKGROUND OF THE INVENTION

Field of the Invention

The aspect of the embodiments relates to a focus adjustment technique in an image capture apparatus having a focus bracket shooting function.

Description of the Related Art

Among image capture apparatuses such as an electronic still camera, an image capture apparatus is conventionally known which records a plurality of images whose focal distance is shifted back and forth in one release in order to capture a close-up photo that is difficult to be focused or quickly capture an image of a moving object and from which one best image can be selected after image capturing. The image capture apparatus can simultaneously record a plurality of images whose focal distances are different, so that the method of the image capture apparatus is called "focus bracket shooting". Further, it is possible to create an image that is depth-composed in the image capture apparatus by using the images recorded by the focus bracket shooting.

In Japanese Patent Laid-Open No. H09-135812, a plurality of times of image capturing is performed while varying focus by using an in-focus position as a reference value of focus variation image capturing. For example, a technique is proposed where image capturing is performed a total of five times at −1.0 D, −0.5 D, 0D, +0.5 D, and +1.0 D. Further, Japanese Patent No. 5278564 discloses that when performing the focus bracket shooting and capturing a plurality of images front and rear of an in-focus point determined by a camera, the greater a focus evaluation value at the determined in-focus point, the smaller focus variation intervals.

However, in the conventional techniques disclosed in Japanese Patent Laid-Open No. H09-135812 and Japanese Patent No. 5278564 described above, images are captured at equal intervals by using the in-focus position as a reference value of the focus variation image capturing. Therefore, when trying to capture an image of an object such as, for example, a flower, there is a case where stamen or the like is focused and a front region such as petals and leaves are difficult to be focused. In addition, even in an object such as a clock, there is a situation where a front region is difficult to be focused in some cases.

SUMMARY OF THE INVENTION

A method of an apparatus having a sensor having a plurality of pixels, each of which photoelectrically converts light fluxes that have passed through different pupil regions of an optical system including a focus lens and output a pair of signals for focus detection. The method includes detecting a focusing state based on an output from the sensor, setting a step width of a position of the focus lens, and controlling to perform a plurality of times of image capturing based on a result of focus detection by the detecting and the set step width by the setting. In the setting, a step width from an in-focus position based on the result of focus detection by the detecting toward an infinity side is set to a value different from a step width from the in-focus position based on the result of focus detection by the detecting toward a closest side.

Further features of the disclosure will become apparent from the following description of exemplary embodiments (with reference to the attached drawings).

BRIEF DESCRIPTION OF THE DRAWINGS

FIGS. 8A to 8E are schematic diagrams showing a screen example in the embodiment of the disclosure.

DESCRIPTION OF THE EMBODIMENTS

Figures 1, 1A:
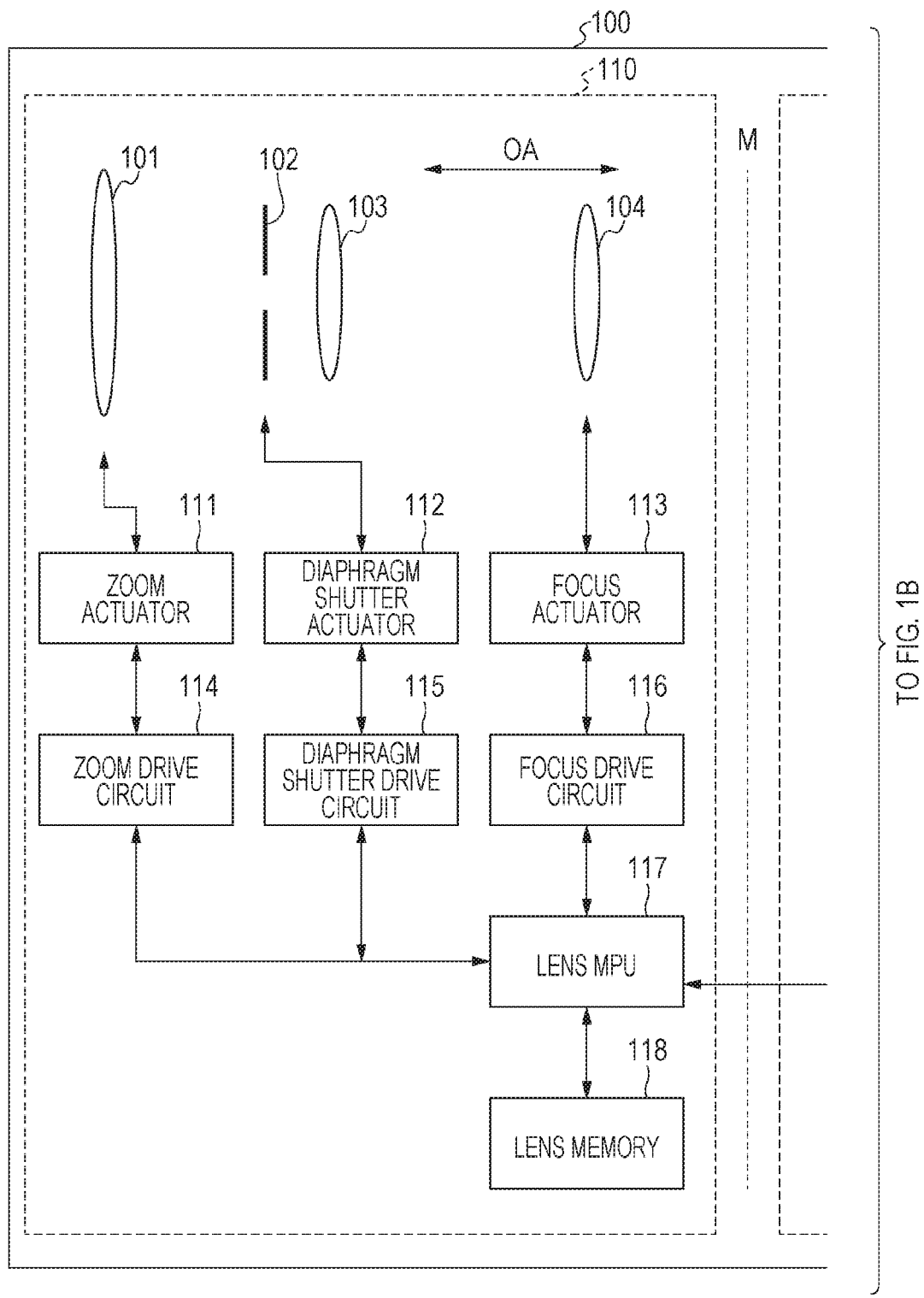
FIGS. 1A and 1B illustrate a block diagram showing a configuration of an image capture apparatus in an embodiment of the disclosure.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Hereinafter, an exemplary embodiment of the disclosure will be described in detail with reference to the attached drawings.

<Configuration of Image Capture Apparatus>

In the present embodiment, as an example of an image capture apparatus, a case will be described where the disclosure is applied to a lens-exchangeable single-lens reflex type digital camera.

Figure 1B:
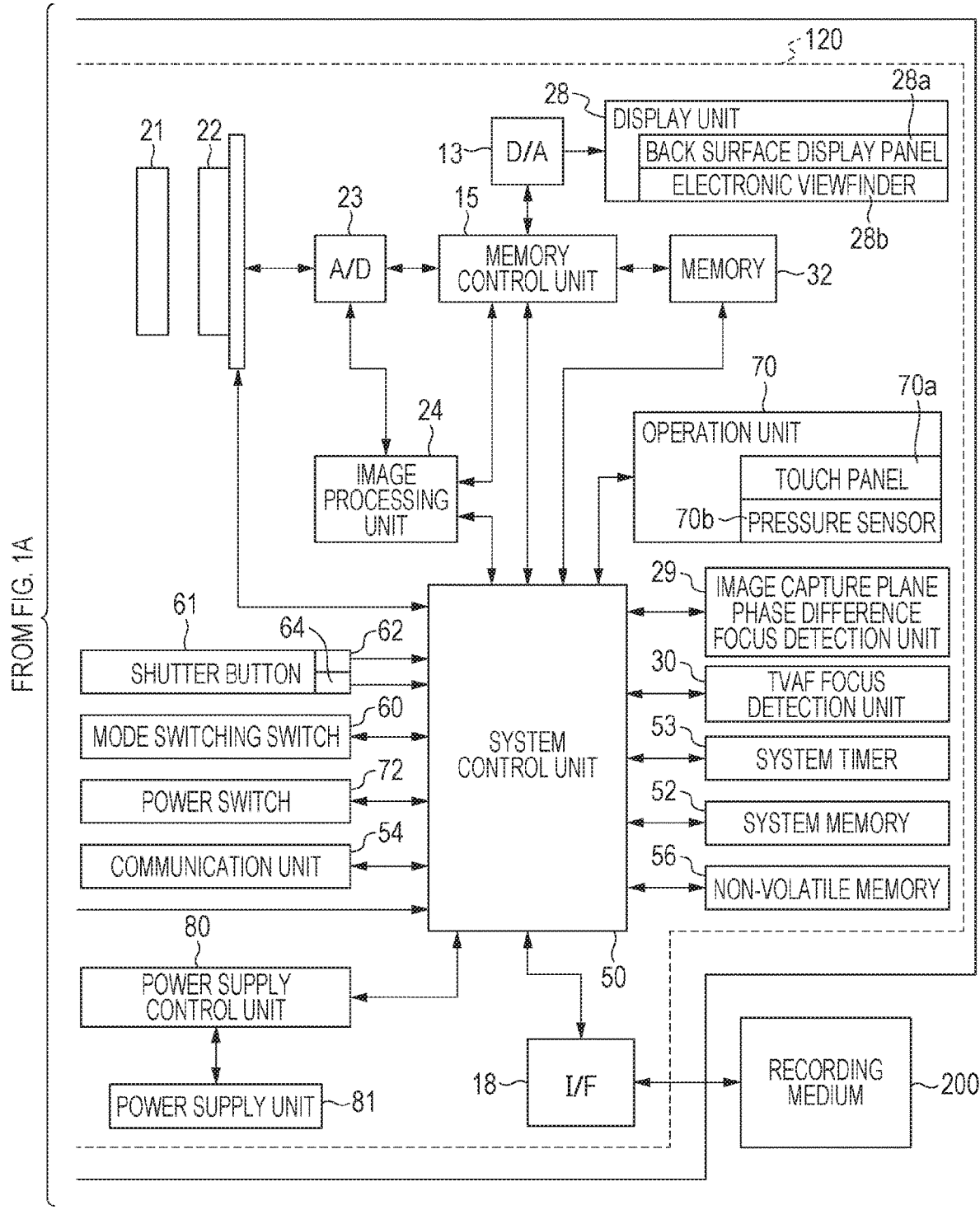

FIGS. 1A and 1B illustrate a block diagram showing a configuration of a main part of the image capture apparatus. As shown in FIGS. 1A and 1B, the image capture apparatus 100 has a lens unit 110 and a camera main body 120.

The lens unit 110 is attached to the camera main body 120 through a mount M indicated by a dotted line at the center of FIGS. 1A and 1B. The lens unit 110 has an optical system (a first lens group 101, a diaphragm 102, a second lens group 103, a focus lens group (hereinafter simply referred to as a focus lens) 104, and a drive/control system. In the present embodiment, the lens unit 110 includes the focus lens 104 and is an image capturing lens that forms an optical image of an object. The first lens group 101 is arranged at the tip of the lens unit 110 on the object side and is held slidably in an optical axis direction OA. The diaphragm 102 has not only a function of adjusting a light amount during image capturing but also a function of a mechanical shutter that controls exposure time during still image image capturing. The diaphragm 102 and the second lens group 103 can integrally move in the optical axis direction OA and realize a zoom function by moving interlocking with the first lens group 101. The focus lens 104 can also move in the optical axis direction OA. An object distance (focal distance) where the lens unit 110 is focused changes according to the position of the focus lens 104. A focus adjustment where the focal distance of the lens unit 110 is adjusted is performed by controlling the position of the focus lens 104 in the optical axis direction OA.

Here, a lens drive method that performs position control of the focus lens 104 will be briefly described. As the lens drive method, there are mainly an ultrasonic wave motor drive method and a DC motor drive method. The ultrasonic wave motor drive method is a method that drives the lens by an ultrasonic wave. A rotor is physically moved by vibrating a driver of a stator, so that a driving sound is small and a lens positioning accuracy is high. On the other hand, the DC motor drive method is a method that drives the lens by a DC motor. The lens is driven through a gear, so that a driving sound is large and a lens positioning accuracy is inferior to that of the ultrasonic wave motor drive method.

The drive/control system has a zoom actuator 111, a diaphragm shutter actuator 112, a focus actuator 113, a zoom drive circuit 114, a diaphragm shutter drive circuit 115, a focus drive circuit 116, a lens MPU 117, and a lens memory 118. The zoom drive circuit 114 drives the first lens group 101 and the second lens group 103 in the optical axis direction OA by using the zoom actuator 111 and controls a field angle of an optical system of the lens unit 110. The diaphragm shutter drive circuit 115 drives the diaphragm 102 by using the diaphragm shutter actuator 112 and controls an aperture diameter and an opening and closing operation. The focus drive circuit 116 drives the focus lens 104 in the optical axis direction OA by using the focus actuator 113 and controls the focal distance of the optical system of the lens unit 110. Further, the focus drive circuit 116 detects a present position of the focus lens 104 by using the focus actuator 113. The lens MPU (processor) 117 performs all calculations and controls related to the lens unit 110 and controls the zoom drive circuit 114, the diaphragm shutter drive circuit 115, and the focus drive circuit 116. Further, the lens MPU 117 is connected with a system control unit 50 through the mount M and communicates commands and data. For example, the lens MPU 117 detects a position of the focus lens 104 and notifies of lens position information in response to a request from the system control unit 50. The lens position information includes information such as a position of the focus lens 104 in the optical axis direction OA, a position in the optical axis direction OA and a diameter of an exit pupil in a state where the optical system does not move, and a position in the optical axis direction OA and a diameter of a lens frame that restricts light flux of the exit pupil. Further, the lens MPU 117 controls the zoom drive circuit 114, the diaphragm shutter drive circuit 115, and the focus drive circuit 116 in response to a request from the system control unit 50. The lens memory 118 stores optical information for automatic focus detection in advance. The system control unit 50 controls an operation of the lens unit 110 by, for example, executing a program stored in an embedded non-volatile memory or the lens memory 118.

The camera main body 120 has an optical system (an optical low-pass filter 21 and an image capture element 22)

and a drive/control system. The first lens group 101, the diaphragm 102, the second lens group 103, and the focus lens 104 of the lens unit 110 and the optical low-pass filter 21 of the camera main body 120 constitute an image capturing optical system.

The optical low-pass filter 21 reduces false color and moire of a captured image. The image capture element 22 is composed of a CMOS image sensor and a peripheral circuit and is arranged with m pixels in the horizontal direction and n pixels in the vertical direction (n and m are integers of 2 or more). The image capture element 22 of the present embodiment has a pupil-dividing function and can perform phase difference AF using image data. An image processing unit 24 generates data for the phase difference AF and image data for display, recording, and a contrast focus detection method (contrast AF, TVAF) from image data outputted from the image capture element 22. Further, the image processing unit 24 performs resizing processing such as predetermined pixel interpolation and reduction and color conversion processing on data from an A/D converter 23 or data from a memory control unit 15. Further, the image processing unit 24 performs predetermined calculation processing by using captured image data, and the system control unit 50 performs exposure control and focus detection control based on an obtained calculation result. Thereby, AF (autofocus) processing, AE (automatic exposure) processing, and EF (flash preliminary light emission) processing of TTL (through-the-lens) method are performed. The image processing unit 24 further performs predetermined calculation processing by using captured image data and performs AWB (automatic white balance) processing of TTL method based on an obtained calculation result.

Data outputted from the A/D converter 23 is directly written into a memory 32 through the image processing unit 24 and the memory control unit 15 or through the memory control unit 15. The memory 32 stores image data which is obtained by the image capture element 22 and converted into digital data by the A/D converter 23 and image data to be displayed on the display unit 28. The memory 32 has a sufficient storage capacity to store a predetermined number of still images and a moving image and a sound of a predetermined period of time.

The memory 32 is also used as a memory (video memory) for image display. A D/A converter 13 converts data for image display stored in the memory 32 into an analog signal and supplies the analog signal to the display unit 28. In this way, the image data for display written into the memory 32 is displayed by the display unit 28 through the D/A converter 13. The display unit 28 performs display according to the analog signal from the D/A converter 13 on a display device such as an LCD. It is possible to perform through-image display (live view display) by analog-converting a digital signal, which is once A/D-converted by the A/D converter 23 and accumulated in the memory 32, in the D/A converter 13, consecutively transferring the analog signal to the display unit 28, and displaying the consecutively transferred analog signal.

A non-volatile memory 56 is a memory used as an electrically erasable/recordable recording medium. For example, an EEPROM is used as the non-volatile memory 56. The non-volatile memory 56 stores constants, programs, and the like for operation of the system control unit 50. The programs here are computer programs for executing various flowcharts described later in the present embodiment.

The system control unit 50 controls the entire image capture apparatus 100. The system control unit 50 is connected with the lens MPU 117 through a signal line of the mount M and communicates commands and data with the lens MPU 117. Further, the system control unit 50 issues an acquisition request of a lens position, a drive request of the diaphragm, the focus lens, and the zoom by a predetermined drive amount, and an acquisition request of optical information unique to the lens unit 110 to the lens MPU 117. Further, the system control unit 50 realizes each processing of the present embodiment described later by executing a program stored in the non-volatile memory 56 described above. A RAM is used as a system memory 52. In the system memory 52, constants and variables for operation of the system control unit 50 and a program and the like read out from the non-volatile memory 56 are unfolded. Further, the system control unit 50 also performs display control by controlling the memory 32, the D/A converter 13, the display unit 28, and the like. A system timer 53 is a clocking unit that measures time used for various controls and time of a built-in clock.

A mode switching switch 60, a shutter button 61, an operation unit 70 are operation units for inputting various operation instructions to the system control unit 50. The mode switching switch 60 switches an operation mode of the system control unit 50 to one of a still image recording mode, a moving image capturing mode, a playback mode, and the like. The still image recording mode includes an automatic image capturing mode, an automatic scene determination mode, a manual mode, various scene modes where an image capturing setting is set for each image capturing scene, a program AE mode, and a custom mode. It is possible to directly switch to one of these modes included in a menu button by the mode switching switch 60. Alternatively, it is possible to switch to one of these modes included in the menu button by using another operation member after once switching to the menu button by the mode switching switch 60. Similarly, the moving image capturing mode may include a plurality of modes.

A first shutter switch 62 turns ON and generates a first shutter switch signal SW1 in the middle of an operation of the shutter button 61 provided to the camera main body 120 of the image capture apparatus 100, that is, in a state of half press (image capturing preparation instruction). Operations such as the AF (autofocus) processing, the AE (automatic exposure) processing, the AWB (automatic white balance) processing, and the EF (flash preliminary light emission) processing are started by the first shutter switch signal SW1.

A second shutter switch 64 turns ON and generates a second shutter switch signal SW2 when the shutter button 61 has been fully operated, or fully pressed (image capturing instruction). By the second shutter switch signal SW2, the system control unit 50 starts a series of image capturing processing operations from readout of a signal from the image capture element 22 to writing image data to a recording medium 200.

Each operation member of the operation unit 70 is appropriately assigned with a function for each scene and operates as various function buttons by selecting and operating various function icons displayed on the display unit 28. As the function buttons, there are, for example, an end button, a return button, an image feeding button, a jump button, a narrowing-down button, and an attribute change button. For example, when the menu button is pressed, a menu screen where various settings can be performed is displayed on the display unit 28. A user can intuitively perform various settings by using the menu screen displayed on the display unit 28, a four-direction (up, down, left, and right) button, and a set button. Further, for example, when a live view button is pressed, it is possible to switch display/non-display of an image acquired through the image capture element 22 on the display unit 28.

The operation unit 70 includes a touch panel 70a that can detect a touch to the display unit 28. The touch panel 70a and the display unit 28 can be integrally formed. For example, the touch panel 70a is formed so that light transmittance does not prevent display of the display unit 28, and the touch panel 70a is attached to an upper layer of a display screen of the display unit 28. Input coordinates of the touch panel 70a and display coordinates on the display unit 28 are associated with each other. Thereby, it is possible to form a GUI (graphical user interface) as if a user could directly operate a screen displayed on the display unit 28. The system control unit 50 can detect operations and states of the touch panel 70a described below.

An operation where a finger or a pen which has not touched the touch panel 70a newly touches the touch panel 70a. That is, start of touch (hereinafter referred to as touch-down).

A state where a finger or a pen touches the touch panel 70a (hereinafter referred to as touch-on).

An operation where a finger or a pen moves on the touch panel 70a while the finger or the pen touches the touch panel 70a (hereinafter referred to as touch-move).

An operation where a finger or a pen which has touched the touch panel 70a is detached. That is, end of touch (hereinafter referred to as touch-up).

A state where nothing touches the touch panel 70a (hereinafter referred to as touch-off).

When the touch-down is detected, the touch-on is also detected at the same time. Normally, the touch-down is continuously detected unless the touch-up is detected. The touch-move is detected while the touch-on is detected. Even when the touch-on is detected, if a touch position does not move, the touch-move is not detected. The touch-off is detected after the touch-up of all fingers and a pen that have touched the touch panel 70a is detected.

These operations and states and position coordinates where a finger or a pen touches on the touch panel 70a are notified to the system control unit 50 through an internal bus, and the system control unit 50 determines what operation is performed on the touch panel 70a based on notified information. Regarding the touch-move, a moving direction of a finger or a pen that moves on the touch panel 70a can be determined for each of vertical and horizontal components on the touch panel 70a based on change of the position coordinates. It is determined that a stroke is written when the touch-up is performed after the touch-down though a certain touch-move on the touch panel 70a. An operation to quickly write a stroke is called a flick. The flick is an operation to quickly move a finger by a certain distance while the finger touches on the touch panel 70a and then detach the finger from the touch panel 70a. In other words, the flick is an operation to quickly trace on the touch panel 70a as if snapping with the finger. It is possible to determine that the flick is performed when the touch-move is detected for a predetermined distance or more at a predetermined velocity or more and then the touch-up is detected. Alternatively, it is determined that a drag is performed when the touch-move is detected for a predetermined distance or more at less than a predetermined velocity. Further, a touch operation where a plurality of positions (for example, two points) are touched at the same time and both touch positions are brought close to each other is referred to as pinch-in, and a touch operation where both touch positions are brought away from each other is referred to as pinch-out. The pinch-out and the pinch-in are collectively referred to as a pinch operation (or simply referred to as pinch). As the touch panel 70a, it is possible to use a touch panel of any type selected from various types such as resistive film type, electrostatic capacitance type, surface acoustic wave type, infrared light type, electromagnetic induction type, image recognition type, and optical sensor type. Regarding the types, there are types that detect that there is a touch when the touch panel is touched, and types that detect that there is a touch when a finger or a pen approaches the touch panel. However, both types may be used.

A power supply control unit 80 is composed of a battery detecting circuit, a DC-DC converter, a switch circuit that switches a block to be energized, and the like, and detects the presence or absence of mounting of battery, a type of the battery, and a remaining battery capacity. Further, the power supply control unit 80 controls the DC-DC converter based on detection results of the above and an instruction of the system control unit 50 and supplies a voltage to each unit including the recording medium 200 for a period of time. A power supply unit 81 is composed of a primary battery such as an alkaline battery or a lithium battery, a secondary battery such as a NiCd battery, a NiMH battery, or a Li battery, an AC adapter, and the like. A recording medium I/F 18 is an interface to the recording medium 200 such as a memory card or a hard disk. The recording medium 200 is a recording medium such as a memory card for recording captured images. The recording medium 200 is composed of a semiconductor memory, an optical disc, a magnetic disc, or the like. A communication unit 54 is connected to the outside wirelessly or through a wired cable, and transmits/receives an image signal, an audio signal, and the like. The communication unit 54 can also be connected to a wireless LAN (Local Area Network) and the Internet. The communication unit 54 can transmit images (including through-images) captured by the image capture element 22 and images recorded in the recording medium 200, and can receive image data and other various information from an external apparatus.

An image capture plane phase difference focus detection unit 29 performs focus detection processing by the phase difference AF by using focus detection data obtained by the image processing unit 24. More specifically, the image processing unit 24 generates a pair of pieces of image data formed by light fluxes passing through a pair of pupil regions of the image capturing optical system as focus detection data, and the image capture plane phase difference focus detection unit 29 detects a defocus amount based on a shift amount of the pair of pieces of image data. In this way, the image capture plane phase difference focus detection unit 29 of the present embodiment performs the phase difference AF (image capture plane phase difference AF) based on an output of the image capture element 22 without using a dedicated AF sensor. An operation of the image capture plane phase difference focus detection unit 29 will be described later in detail.

A TVAF focus detection unit 30 performs focus detection processing of contrast AF based on a TVAF evaluation value (contrast information of image data) generated by the image processing unit 24. The focus detection processing of contrast AF detects a focus lens position where an evaluation value becomes a peak as an in-focus position by moving the focus lens 104.

In this way, the digital camera of the present embodiment can perform both the phase difference AF and the contrast AF, and the digital camera can selectively use the phase difference AF or the contrast AF or combine and use the phase difference AF and the contrast AF depending on circumstances.

<Configuration of Image Capture Element>

Figure 2A:
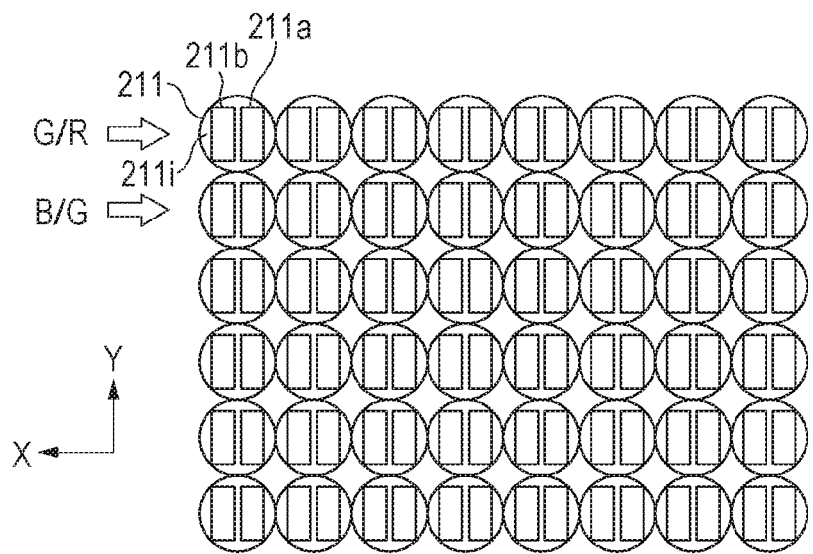
FIG. 2A is a diagram showing a pixel arrangement of an image capture element 22 in an embodiment of the disclosure.
Figure 2B:
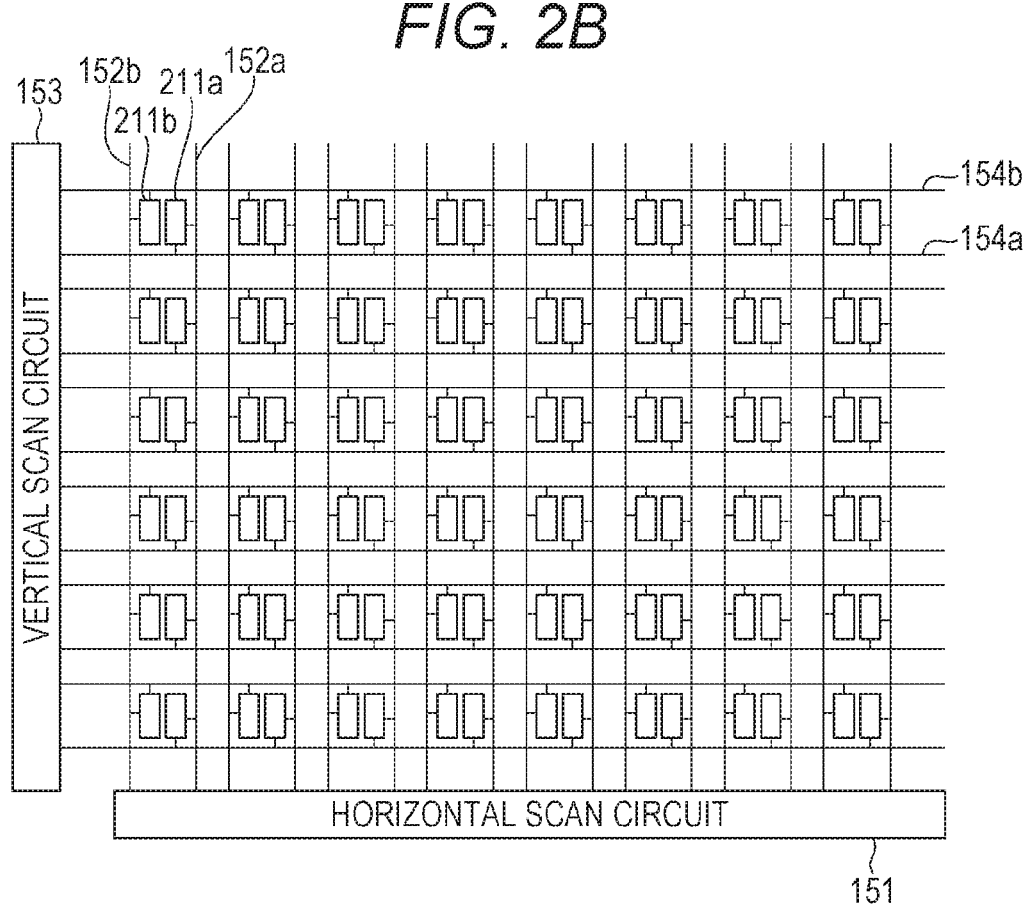
FIG. 2B is a diagram showing a configuration example of a readout circuit of the image capture element 22 in the embodiment of the disclosure.

FIGS. 2A and 2B show a part of a light receiving surface of the image capture element 22 used as an image sensor. In the image capture element 22, pixel portions, each of which has two photodiodes, which are photoelectric conversion units, for one micro lens, are arranged in an array form to enable the image capture plane phase difference AF. Thereby, each pixel portion can receive light fluxes from divided exit pupils of a lens barrel. In other words, the image capture element 22 has a plurality of pixels, each of which can photoelectrically convert light fluxes that have passed through different pupil regions of the image capturing optical system and output a pair of signals for focus detection.

FIG. 2A is a diagram showing a pixel arrangement of the image capture element 22 according to the present embodiment. FIG. 2A shows a state where a range of six rows in a vertical direction (Y direction) and eight columns in a horizontal direction (X direction) of a two-dimensional C-MOS area sensor is observed from a lens unit 110 side. The image capture element 22 is provided with a color filter of Bayer arrangement. In pixels in odd-numbered rows, color filters of green (G) and red (R) are alternately arranged in order from left. In pixels in even-numbered rows, color filters of blue (B) and green (G) are alternately arranged in order from left. In a pixel 211, a circle 211i represents an on-chip micro lens. Each of a plurality of rectangles 211a and 211b arranged inside the on-chip micro lens is a photoelectric conversion unit.

In the image capture element 22, a photoelectric conversion unit of all the pixels is divided into two parts in the X direction, and a photoelectric conversion signal of each photoelectric conversion unit and a sum of the photoelectric conversion signals can be independently read out. Further, it is possible to obtain a signal corresponding to a photoelectric conversion signal of one photoelectric conversion unit by subtracting a photoelectric conversion signal of the other photoelectric conversion unit from the sum of the photoelectric conversion signals. The photoelectric conversion signal of each photoelectric conversion unit may be used as data for the phase difference AF or may be used to generate a parallax image constituting a 3D (3-dimensional) image. Further, the sum of the photoelectric conversion signals can be used as normal captured image data.

FIG. 2B is a diagram showing a configuration example of a readout circuit of the image capture element 22 of the present embodiment. Horizontal scan lines 152a and 152b and vertical scan lines 154a and 154b are wired in boundary portions of the pixels of the horizontal scan circuit 151 and the vertical scan circuit 153. Signals are read from the photoelectric conversion units to the outside through these scan lines.

Figure 3A:
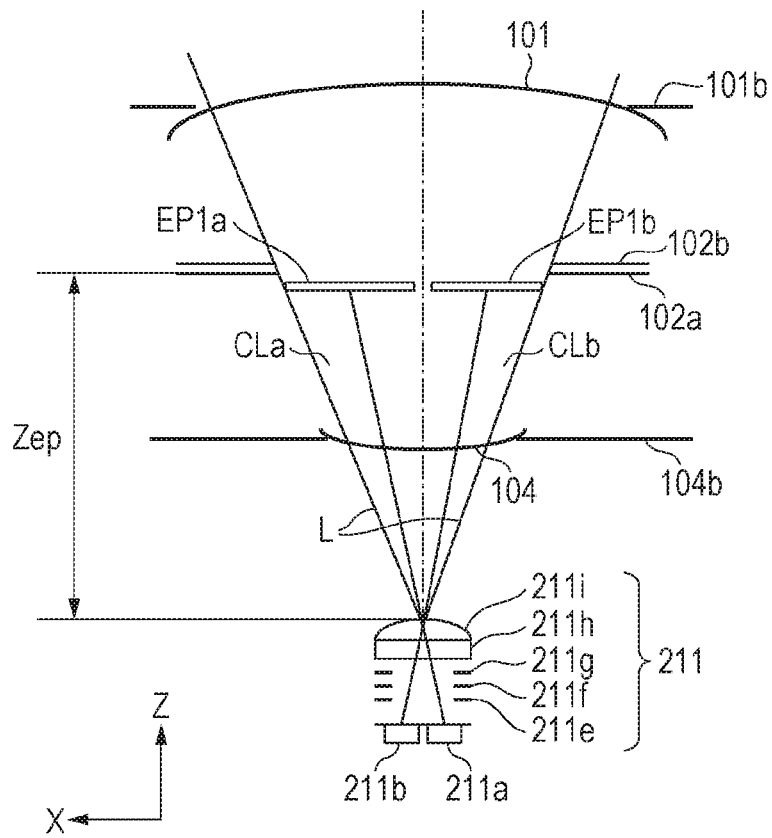
FIGS. 3A and 3B are diagrams for explaining a conjugate relation between an exit pupil surface of an image capturing optical system in the embodiment of the disclosure and a photoelectric conversion unit of an image capture element arranged at statue height zero, that is, close to a center of an image plane.
Figure 3B:
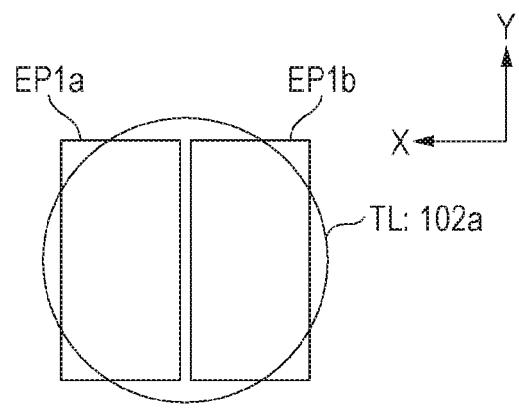

FIGS. 3A and 3B are diagrams for explaining a conjugate relation between an exit pupil surface of the image capturing optical system and the photoelectric conversion unit of the image capture element arranged at statue height zero, that is, close to a center of an image plane in the image capture apparatus of the present embodiment. The photoelectric conversion unit in the image capture element and the exit pupil surface of the image capturing optical system are designed to be in a conjugate relation by the on-chip micro lens. The exit pupil of the image capturing optical system substantially corresponds to a surface where an iris diaphragm for light amount adjustment is generally placed. On the other hand, the image capturing optical system of the present embodiment is a zoom lens having a magnification function. However, when a magnification operation is performed, a distance from an image plane of the exit pupil and a size vary depending on an optical type. FIGS. 3A and 3B show a state where a focal distance of the lens unit 110 is located at a center between a closest end and an infinity end. By using an exit pupil distance Zep in this state as a standard value, a shape and an eccentric parameter according to a statue height (X, Y coordinates) of the on-chip micro lens are optimally designed.

In FIG. 3A, the lens unit 110 includes a lens barrel member 101b that holds the first lens group 101, and a lens barrel member 104b that holds the focus lens 104. Further, the lens unit 110 includes an aperture plate 102a that defines an aperture diameter when the diaphragm 102 is opened and a diaphragm blade 102b for adjusting the aperture diameter during stopping. Virtual images 101b, 102a, 102b, and 104b that act as limiting members of a light flux passing through the image capturing optical system indicate optical virtual images when observing from an image plane. A composite aperture close to the diaphragm 102 is defined as an exit pupil of a lens, and a distance from the image plane is defined as Zep as described above.

A pixel 211 is arranged close to a center of the image plane and is called a center pixel in the present embodiment. The center pixel 211 includes photoelectric conversion units 211a and 211b, wiring layers 211e to 211g, a color filter 211h, and an on-chip micro lens 211i in this order from a lowermost layer. The two photoelectric conversion units are projected to the exit pupil surface of the image capturing optical system by the on-chip micro lens 211i. In other words, the exit pupil of the image capturing optical system is projected to surfaces of the photoelectric conversion units through the on-chip micro lens 211i.

FIG. 3B shows projection images of the photoelectric conversion units on the exit pupil surface of the image capturing optical system, and the projection images corresponding to the photoelectric conversion units 211a and 211b are EP1a and EP1b, respectively. In the present embodiment, the image capture element has a pixel that can obtain an output of one of the two photoelectric conversion units 211a and 211b and a sum of outputs of both photoelectric conversion units. The sum of outputs of both photoelectric conversion units is obtained by photoelectrically converting light fluxes passing through both regions of projection images EP1a and EP1b which are substantially the entire pupil region of the image capturing optical system.

In FIG. 3A, when outermost portions of the light flux passing through the image capturing optical system are indicated by L, the light flux L is regulated by the aperture plate 102a of the diaphragm, so that regarding the projection images EP1a and EP1b, vignetting hardly occurs in the image capturing optical system. In FIG. 3B, the light flux L in FIG. 3A is indicated by TL. Most of the projection images EP1a and EP1b of the photoelectric conversion units is included inside a circle indicated by TL, so that it is known that the vignetting hardly occurs. The light flux L is regulated by only the aperture plate 102a of the diaphragm, so that TL can be paraphrased as 102a. In this case, in the center of the image plane, a vignetting state of the projection images EP1a and EP1b is symmetric with respect to the optical axis, so that light amounts received respectively by the photoelectric conversion units 211a and 211b are the same.

<Description of Phase Difference AF Focus Detection Operation>

Regarding a plurality of pixels 211 in a predetermined range arranged in the same pixel row, an image formed by connecting together outputs of the photoelectric conversion units 211a is defined as an AF-A image, and an image formed by connecting together outputs of the photoelectric conversion units 211b is defined as an AF-B image. As outputs of the photoelectric conversion units 211a and 211b, a pseudo luminance (Y) signal is used, which is calculated by adding outputs of green, red, blue, and green included in a unit arrangement of a color filter. However, the AF-A image and the AF-B image may be formed for each color of red, blue, and green. By detecting a relative image shift amount between the AF-A image and the AF-B image formed in this way by using a correlation calculation, it is possible to detect a focal point shift amount (defocus amount) that indicates a focusing state of a predetermined region. In the present embodiment, an output of one photoelectric conversion unit and a sum of outputs of all photoelectric conversion units are read from the image capture element 22. For example, when the output of the photoelectric conversion unit 211a and a sum of the outputs of the photoelectric conversion units 211a and 211b are read out, the output of the photoelectric conversion unit 211b is acquired by subtracting the output of the photoelectric conversion unit 211a from the sum. Thereby, it is possible to obtain both the AF-A image and the AF-B image, so that the phase difference AF can be realized.

When performing the phase difference AF, the system control unit 50 performs control to read out an output from the image capture element 22. Then, the system control unit 50 gives information of a focus detection region to the image processing unit 24 and instructs the image processing unit 24 to generate data of the AF-A image and the AF-B image from outputs of pixels included in the focus detection region and supply the data to the image capture plane phase difference focus detection unit 29. The image processing unit 24 generates the data of the AF-A image and the AF-B image and outputs the data to the image capture plane phase difference focus detection unit 29 according to the instruction.

In the present embodiment, as an example, a configuration is described where the exit pupil is divided into two parts in the horizontal direction. However, for some pixels of the image capture element, the exit pupil may be divided into two parts in the vertical direction. Further, a configuration may be employed where the exit pupil may be divided in both the horizontal and the vertical directions. When pixels where the exit pupil is divided in the vertical direction are provided, it is possible to perform phase difference AF corresponding to contrast of an object not only in the horizontal direction but also in the vertical direction.

<Description of TVAF Focus Detection Operation>

Figure 4:
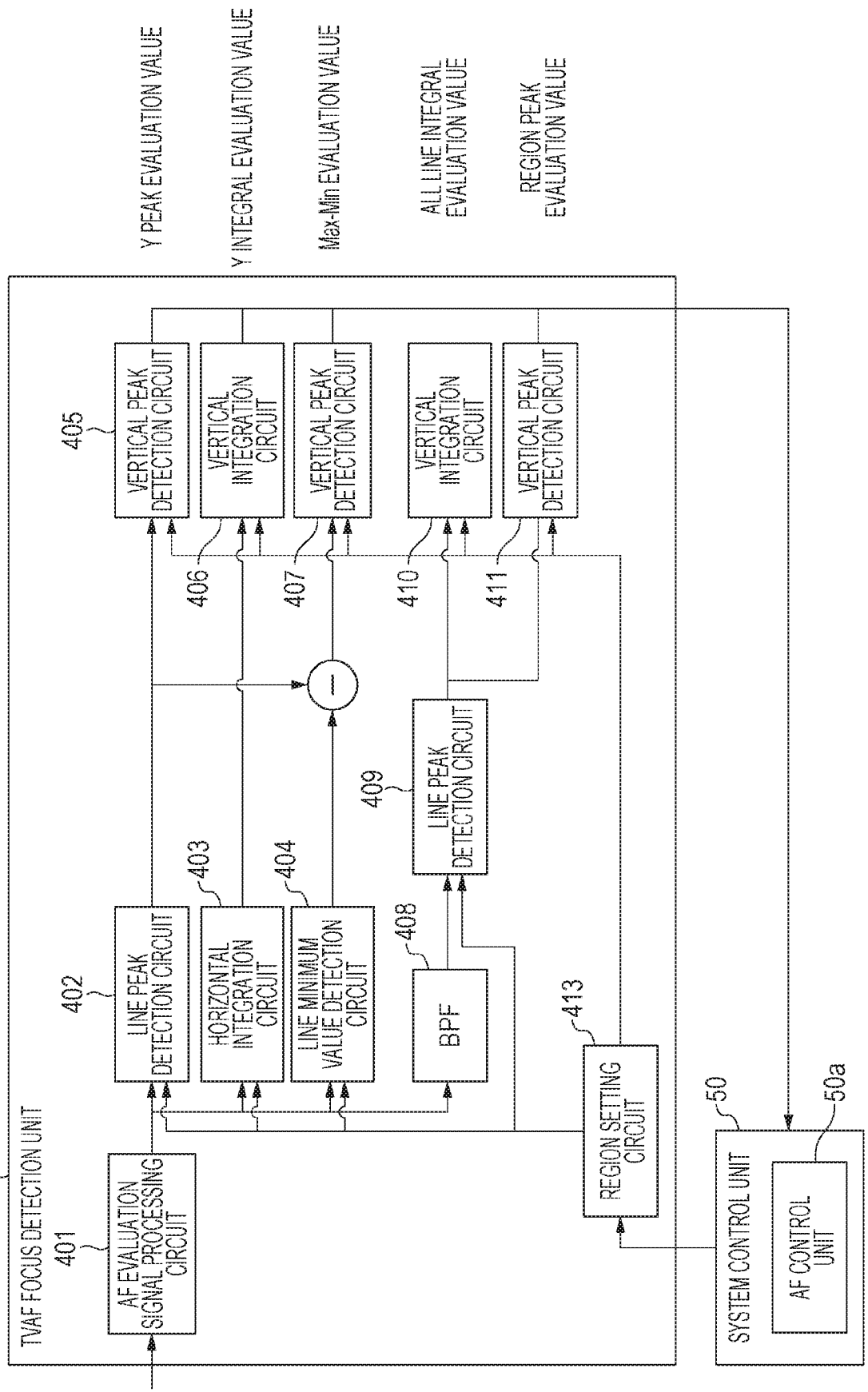
FIG. 4 is a block diagram showing a configuration of a TVAF focus detection unit in the embodiment of the disclosure.

Next, the contrast AF (TVAF) will be described with reference to FIG. 4. The contrast AF is realized when the system control unit 50 and the TVAF focus detection unit 30 repeatedly perform drive of the focus lens and calculation of evaluation value in cooperation with each other. First, when RAW image data is inputted from the image processing unit 24 into the TVAF focus detection unit 30, an AF evaluation signal processing circuit 401 performs extraction of a green (G) signal from a Bayer array signal and gamma correction processing where low brightness components are enhanced and high brightness components are suppressed. In the present embodiment, a case where the TVAF is performed by using the green (G) signal is described. However, all signals of red (R), blue (B), and green (G) may be used. Alternatively, the luminance (Y) signal may be generated by using all RGB colors. An output signal generated by the AF evaluation signal processing circuit 401 is called a luminance signal Y in the description below regardless of the type of used signal.

The system control unit 50 sets a focus detection region in a region setting circuit 413. The region setting circuit 413 generates a gate signal that selects a signal in the set region. The gate signal is inputted into a line peak detection circuit 402, a horizontal integration circuit 403, a line minimum value detection circuit 404, a line peak detection circuit 409, vertical integration circuits 406 and 410, and vertical peak detection circuits 405, 407, and 411. A timing when the luminance signal Y is inputted into the above circuits is controlled so that each focus evaluation value is generated by the luminance signal Y in the focus detection region. A plurality of regions can be set in the region setting circuit 413 in accordance with the focus detection region.

Next, a calculation method of a Y peak evaluation value will be described. A gamma-corrected luminance signal Y is inputted into the line peak detection circuit 402, and a Y line peak value for each horizontal line is obtained in the focus detection region set in the region setting circuit 413. An output of the line peak detection circuit 402 is peak-held in the vertical direction in the focus detection region in the vertical peak detection circuit 405, and the Y peak evaluation value is generated. The Y peak evaluation value is an index effective for determining a high luminance object and a low-light intensity object.

Next, a calculation method of a Y integral evaluation value will be described. The gamma-corrected luminance signal Y is inputted into the horizontal integration circuit 403, and an integral value of Y is obtained for each horizontal line in the focus detection region. Further, an output of the horizontal integration circuit 403 is integrated in the vertical direction in the focus detection region in the vertical integration circuit 406, and the Y integral evaluation value is generated. The Y integral evaluation value can be used as an index to determine brightness in the entire focus detection region.

Next, a calculation method of a Max−Min evaluation value will be described. The gamma-corrected luminance signal Y is inputted into the line peak detection circuit 402, and a Y line peak value for each horizontal line is obtained in the focus detection region. Further, the gamma-corrected luminance signal Y is inputted into the line minimum value detection circuit 404, and a minimum value of the luminance signal Y is detected for each horizontal line in the focus detection region. The line peak value and the minimum value of the luminance signal Y, which are detected for each horizontal line, are inputted into a subtracter, and (the line peak value−the minimum value) is inputted into the vertical peak detection circuit 407. The vertical peak detection circuit 407 performs peak-hold in the vertical direction in the focus detection region, and generates the Max−Min evaluation value. The Max−Min evaluation value is an index effective for determining low contrast/high contrast.

Next, a calculation method of a region peak evaluation value will be described. When the gamma-corrected luminance signal Y is passed through a BPF 408, a specific frequency component is extracted and a focus signal is generated. The focus signal is inputted into the line peak detection circuit 409, and a line peak value for each horizontal line is obtained in the focus detection region. The line peak value is peak-held in the focus detection region by the vertical peak detection circuit 411, and the region peak evaluation value is generated. Variation of the region peak evaluation value is small even when an object moves in the focus detection region, so that the region peak evaluation value is an index effective for restart determination that determines whether to move from an in-focus state to processing of searching for an in-focus point again.

Next, a calculation method of an all line integral evaluation value will be described. In the same manner as for the region peak evaluation value, the line peak detection circuit 409 obtains a line peak value for each horizontal line in the focus detection region. The line peak values are inputted into the vertical integration circuit 410, the line peak values are integrated with respect to all the horizontal scan lines in the vertical direction in the focus detection region, and the all line integral evaluation value is generated. A dynamic range of a high frequency all line integral evaluation value is wide due to effect of integration, and the sensitivity of the high frequency all line integral evaluation value is high, so that the high frequency all line integral evaluation value is a main AF evaluation value. Therefore, in the present embodiment, a simple expression "focus evaluation value" means the all line integral evaluation value.

An AF control unit 50a of the system control unit 50 acquires each focus evaluation value described above and moves the focus lens 104 for a predetermined length in a predetermined direction along the optical axis direction through the lens MPU 117. Then, the AF control unit 50a calculates various evaluation values described above based on newly obtained image data, and detects a focus lens position where the all line integral evaluation value becomes a maximum value. In the present embodiment, various AF evaluation values are calculated in a horizontal line direction and a vertical line direction. Thereby, it is possible to perform focus detection on contrast information of an object in the horizontal direction and the vertical direction which are orthogonal to each other.

Embodiment 1

Hereinafter, an operation of an embodiment 1 will be described with reference to FIGS. 5 to 8.

Figure 5:
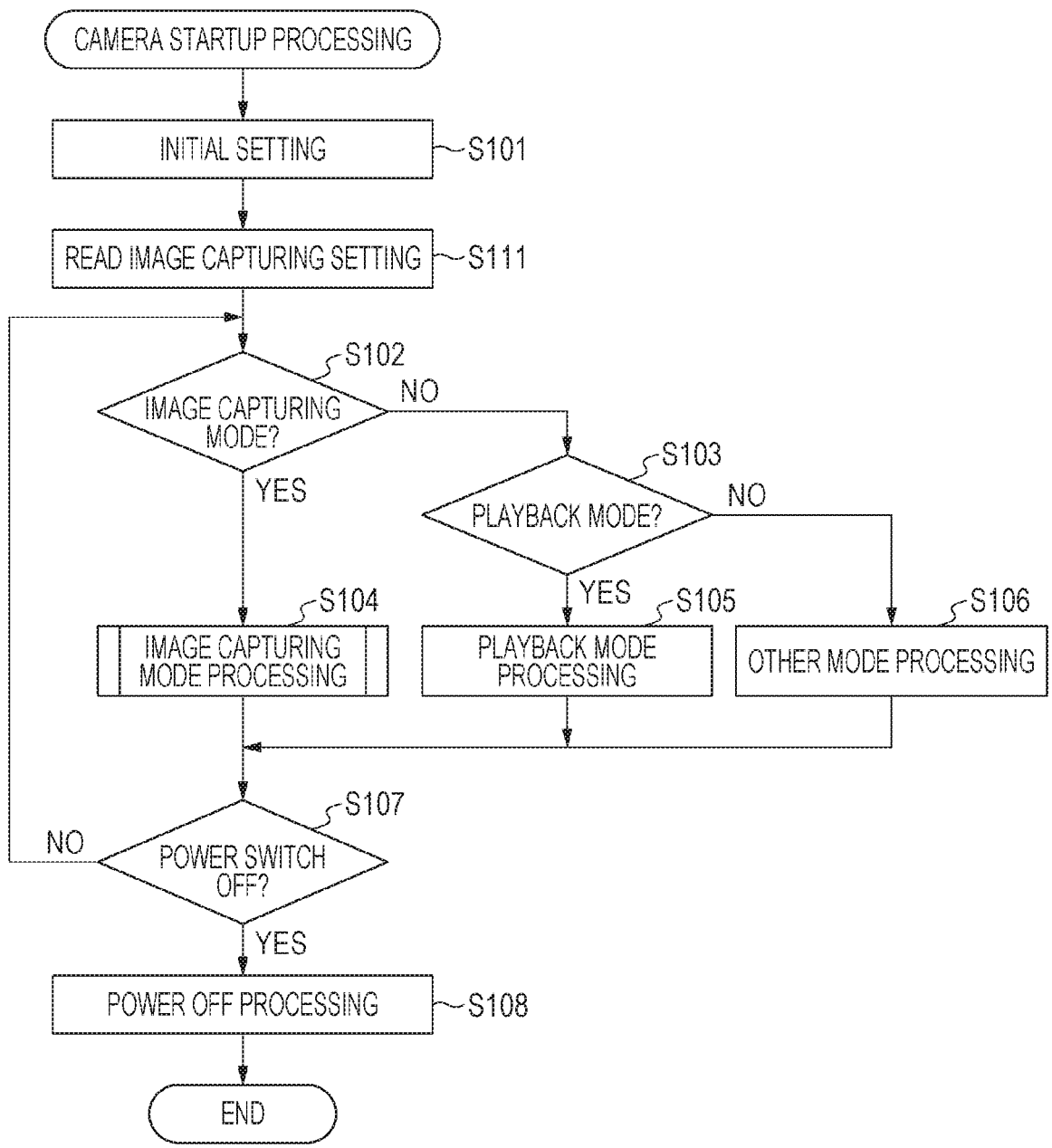
FIG. 5 is a flowchart showing image capturing mode processing in the embodiment of the disclosure.

FIG. 5 is a flowchart related to an overall operation of the camera main body 120 of the image capture apparatus 100 according to the present embodiment. Each processing in the flowchart is realized when the system control unit 50 executes a program stored in the non-volatile memory 56 after a power switch 72 is operated and a power source is turned on.

In S101, flags, control variables, and the like are initialized. In S111, image capturing settings stored in the system memory 52 are read out. Here, the image capturing settings are setting values of a setting indicating whether to perform focus bracket shooting, the number of times of image capturing of a plurality of times of image capturing in the focus bracket shooting, and a step width of the focus bracket shooting. In the description below, it is assumed that "YES" is selected as a setting indicating whether to perform focus bracket shooting.

These image capturing settings can be set by pressing the menu button of the operation unit 70. The system control unit 50 displays the menu screen and changes the image capturing settings according to a user operation performed on the operation unit 70. Here, setting screen examples of a continuous image capturing operation setting function will be described with reference to FIGS. 8A to 8E.

FIG. 8A shows a list display of a function 702. A user moves a cursor 704 by pressing an up/down/left/right button included in the operation unit 70, and transits to a setting change screen of an arbitrary function by pressing a SET button. FIG. 8B is an example of a focus bracket shooting screen. A function title 712 and child functions 714 to 718 are displayed. Further, a function 714 and a setting value 720 thereof are displayed in a list. Focus bracket shooting 714 is an item for setting whether to perform the focus bracket shooting. A setting screen example is as shown in FIG. 8C, and the user selects a setting value from among options 732. The user can select a setting "NO" in addition to "YES" that is a default value. When "YES" is set, the function is performed. When "NO" is set, the function is not performed. The number of times of image capturing 716 is an item for setting the number of times of image capturing in the focus bracket shooting. A setting screen example is as shown in FIG. 8D, and the user sets the number of times of image capturing by changing each digit of a three-digit number. A default value is 100. Here, a hundredth place is focused, and a number in the hundredth place can be changed. At this time, an index 748 and an index 750 are displayed. The number can be changed by pressing an up/down button included in the operation unit 70 or performing a touch operation on each index. A step width 718 is an item for setting a step width of the focus lens in the focus bracket shooting. A setting screen example is as shown in FIG. 8E, and the user sets the step width by changing a one-digit number from 1 to 9. Here, the step width 1 indicates a focus step width of a certain degree of precision error. A default value is 4. Here, an index 764 and an index 766 are displayed. The number can be changed by pressing an up/down button included in the operation unit 70 or performing a touch operation on each index. The setting in the focus bracket shooting can be performed by the settings described above.

Let us return to the description of FIG. 5. In S102, the system control unit 50 determines a setting position of the mode switching switch 60. When the setting position is set to an image capturing mode, the system control unit 50 proceeds to S104. When the setting position is set to other than the image capturing mode, the system control unit 50 proceeds to S103. In S103, the system control unit 50 determines the setting position of the mode switching switch 60. When the setting position is set to a playback mode, the system control unit 50 proceeds to S105. When the setting position is set to other than the playback mode, the system control unit 50 proceeds to S106. Details of image capturing mode processing in S104 will be described later.

In S106, the system control unit 50 performs processing related to other modes. The other modes include a communication mode that performs transmission and reception of a file stored in the recording medium 200. In S107, the system control unit 50 determines whether or not the power switch 72 is off. When the power switch 72 is on, the system control unit 50 returns to S102. When the power switch 72 is off, the system control unit 50 proceeds to S108. When power off processing is completed, the operation of the image capture apparatus ends.

Figure 6:
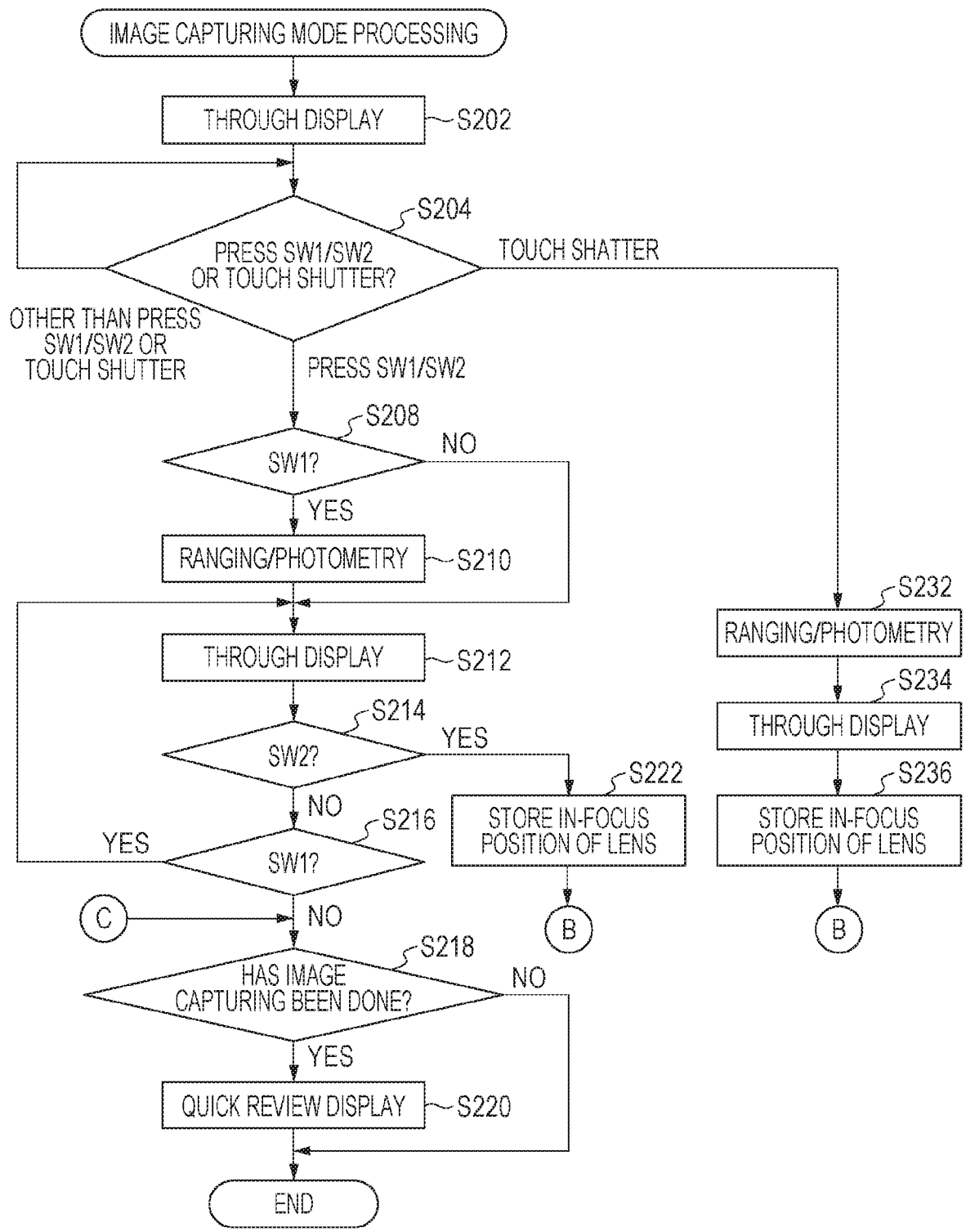
FIG. 6 is a flowchart showing image capturing mode processing in the embodiment of the disclosure.

FIG. 6 is a flowchart related to the image capturing mode processing performed by the system control unit 50 according to the present embodiment.

In S202, a display of a through-image is started on the display unit 28. In S204, it is determined whether an input of an operation instruction is detected by image capturing operation determination processing. The first shutter switch 62, the second shutter switch 64, and a touch-down operation 70 can be detected by the image capturing operation determination processing. When it is detected that the first shutter switch 62 or the second shutter switch 64 is pressed, the processing proceeds to S208. When the touch-down operation 70 is detected, the processing proceeds to S232, and when the touch-down operation 70 is not detected, the processing proceeds to S204.

In S208, the image capturing operation determination processing determines whether the first shutter switch 62 is pressed. When the first shutter switch 62 is pressed, the processing proceeds to S210. Otherwise, the processing proceeds to S212. In S210, AF is performed according to an AF method of image-sensing plane AF, and AE is performed at the same time. In S212, a display of a through-image is started on the display unit 28. When the through-image has already been displayed, the content of the display is not changed.

In S214, the image capturing operation determination processing determines whether the second shutter switch 64 is pressed. When the second shutter switch 64 is pressed, the processing proceeds to S222. Otherwise, the processing proceeds to S216. In S216, the image capturing operation determination processing determines whether the first shutter switch 62 is pressed. When the first shutter switch 62 is pressed, the processing proceeds to S212. Otherwise, the processing proceeds to S218. In S218, it is determined whether a series of image capturing processing operations from reading a signal from the image capture element 22 to writing image data into the recording medium 200 have been performed, that is, whether one or more images have been captured. When the series of image capturing processing operations have been performed, the processing proceeds to S220. Otherwise, the flowchart is ended. In S220, regarding an image that is captured most recently, image data for display (quick review image) stored in the memory 32 is displayed on the display unit 28.

In S222, the system control unit 50 stores a position in the optical axis direction OA of the focus lens 104. Thereafter, the processing proceeds to B in FIG. 7. In S232, AF is performed according to an AF method of image-sensing plane AF, and AE is performed at the same time. In S234, a display of a through-image is started on the display unit 28. When the through-image has already been displayed, the content of the display is not changed. In S236, the system control unit 50 stores a position in the optical axis direction OA of the focus lens 104. Thereafter, the processing proceeds to B in FIG. 7.

Figure 7:
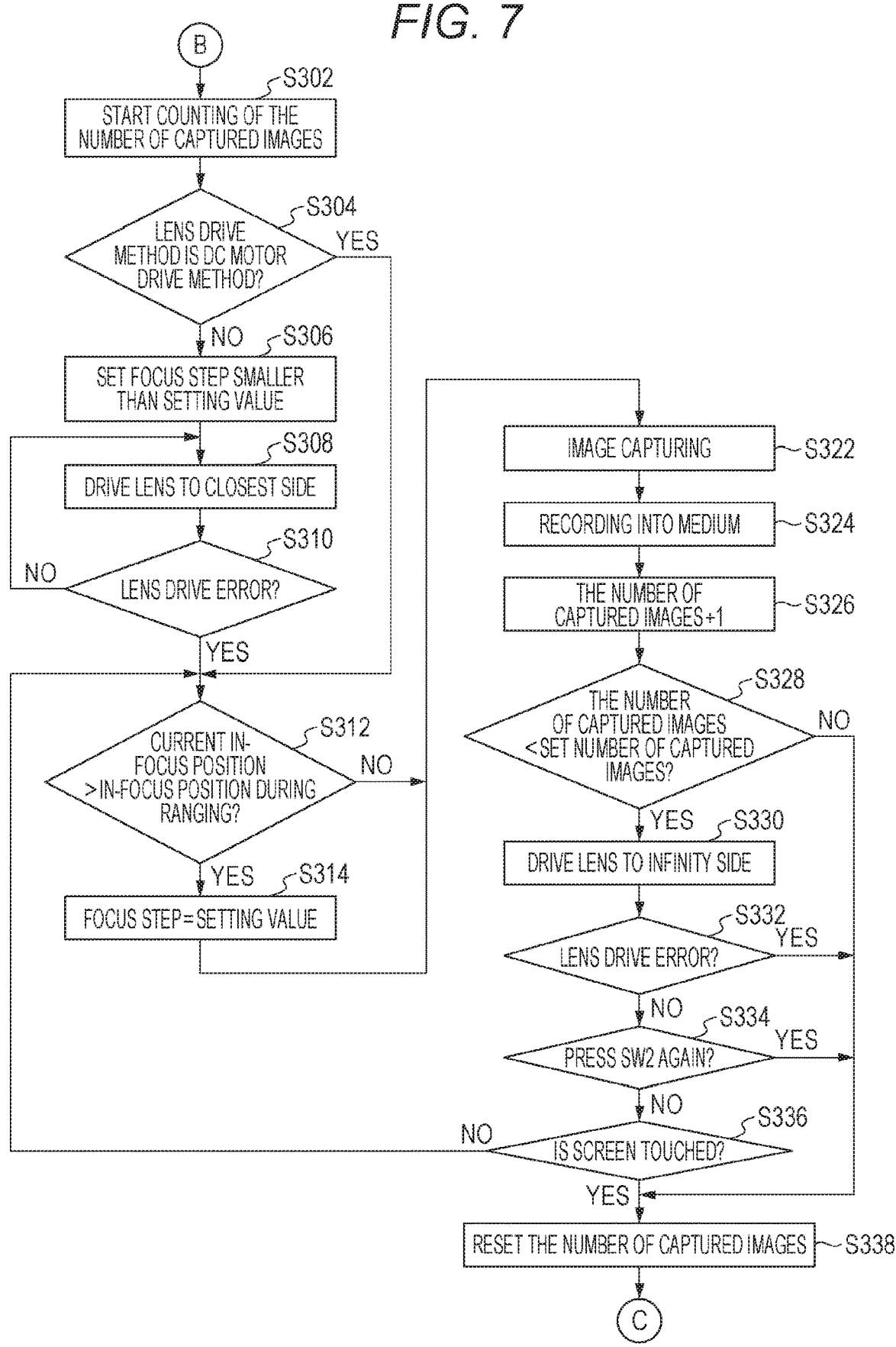
FIG. 7 is a flowchart showing image capturing mode processing in the embodiment of the disclosure.

FIG. 7 is a flowchart of image capturing processing performed by a shutter button operation and a touch-down operation according to the present embodiment.

In this flowchart, an operation is described in which an in-focus position is shifted from an in-focus position where focus detection is performed during image capturing to a closest side and image capturing is started. Thereby, it is possible to generate a focused image from an in-focus position closer to the closest side than to a position where focus detection is performed during image capturing by performing depth composition processing using an image outputted by image capturing in post-processing.

Figure 9A:
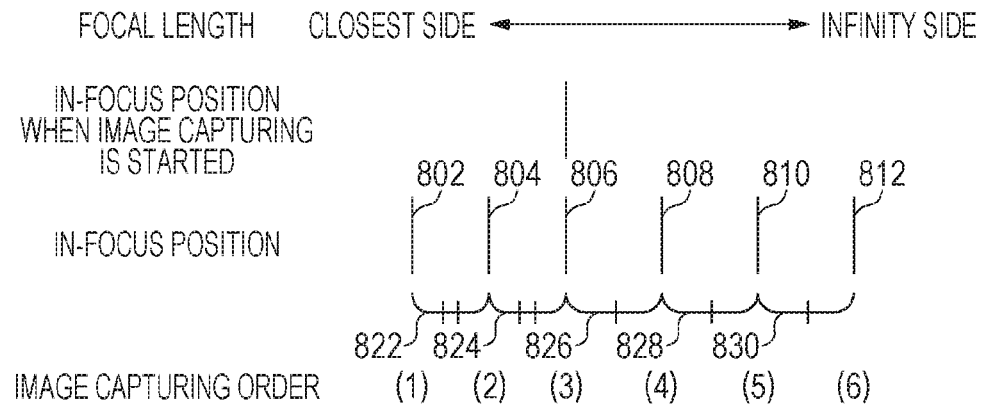
FIGS. 9A to 9C are schematic diagrams showing an in-focus position, a step width, and an image capturing order in the embodiment of the disclosure.

A depth of field when the closest side is focused is shorter than that when the infinity side is focused, so that image capturing should be performed by sequentially setting in-focus positions with narrower step widths in order to generate an in-focus image. The in-focus position in this case will be described with reference to FIG. 9A. FIG. 9A shows in-focus positions, step widths, and the order of image capturing when the image capturing is performed while the in-focus position is shifted. Six in-focus positions from an in-focus position 802 to an in-focus position 812 are shown. The leftmost in-focus position is an in-focus position on the closest side, and the rightmost in-focus position is an in-focus position on the infinity side. Intervals between each in-focus position are step widths 822 to 830. The in-focus position where the focus detection is performed is a position indicated by the in-focus position 806. Intervals from the in-focus position where the focus detection is performed to the in-focus position on the infinity side are in accordance with a step width menu from the step width 826 to the step width 830. On the other hand, intervals from the in-focus position where the focus detection is performed to the in-focus position on the closest side are step widths shorter than a step width menu from the step width 822 to the step width 824. In-focus positions of an image to be captured are (1) to (6) sequentially located from the closest side to the infinity side. By performing image capturing while the in-focus position is changed in this way, it is possible to generate a focused image from an in-focus position closer to the closest side than the position where the focus detection is performed during image capturing.

Let us return to the description of FIG. 7. In S302, the system control unit 50 starts counting of the number of captured images of the focus bracket shooting. In S304, the system control unit 50 acquires lens drive method information stored in the lens memory 118 through the lens MPU 117 and determines a lens drive method. When the lens drive method is a DC motor drive method, the processing proceeds to S312. Otherwise, the processing proceeds to S306. In S306, the system control unit 50 sets a focus step, by which the focus lens 104 is moved, to a value smaller than a step width set in the menu. For example, when a step width setting is "4", the focus step is set to "3" which is a value smaller than 4.

In S308, the system control unit 50 moves the focus lens 104 toward the closest side by the focus step width set in step S306 through the lens MPU 117. In S310, the system control unit 50 determines whether an error signal is received from the lens MPU 117, that is, whether the focus lens 104 cannot move any more toward the closest side. When the error signal is received, the processing proceeds to S312. Otherwise, the processing proceeds to S308. In S312, the system control unit 50 acquires the current in-focus position through the lens MPU 117 and determines whether the current in-focus position is the same as an in-focus position at the time of focus detection or is located on the infinity side. When the current in-focus position is the same as the in-focus position at the time of focus detection or is located on the infinity side, the processing proceeds to S314. Otherwise, the processing proceeds to S322.

In S314, the system control unit 50 sets a step width set by the menu to a focus step of the image capturing setting. In S322, the system control unit 50 performs a series of image capturing processing operations from readout of a signal from the image capture element 22 to image processing by the image processing unit 24. In S324, the system control unit 50 writes image data processed in S322 into the recording medium 200. In S326, the system control unit 50 increments an image capturing count stored in the system memory 52 by 1.

In S328, the system control unit 50 determines whether the image capturing count stored in the system memory 52 is smaller than the number of images to be captured that is set from the menu. When the image capturing count is smaller than the number of images to be captured that is set from the menu, the processing proceeds to S330. Otherwise, the processing proceeds to S338. In S330, the system control unit 50 moves the focus lens 104 toward the infinity side by the focus step width set in step S314 through the lens MPU 117. In S332, the system control unit 50 determines whether an error signal is received from the lens MPU 117, that is, whether the focus lens 104 cannot move any more toward the infinity side. When the error signal is received, the processing proceeds to S338. Otherwise, the processing proceeds to S334.

In S334, the system control unit 50 determines whether the second shutter switch 64 is pressed. When the second shutter switch 64 is pressed, the processing proceeds to S338. Otherwise, the processing proceeds to S336. Thereby, even while image capturing is being performed, when the second shutter switch is pressed again, the image capturing can be cancelled. In S336, the system control unit 50 determines whether a back surface display panel 28a is touched and the touch panel 70a detects touch-down. When the touch panel 70a detects touch-down, the processing proceeds to S338. Otherwise, the processing proceeds to S322. Thereby, even while image capturing is being performed, when the back surface display panel 28a is touched, the image capturing can be cancelled. In S338, the system control unit 50 resets the image capturing count stored in the system memory 52. Thereafter, the processing proceeds to C in FIG. 7.

In this way, by the flows of FIGS. 5 to 7, the intervals from the in-focus position where the focus detection is performed to the in-focus position on the closest side are step widths shorter than the step width menu. By performing image capturing while the in-focus position is changed, it is possible to generate a focused image from an in-focus position closer to the closest side than the position where the focus detection is performed during image capturing.

In S304, when the lens drive method is the DC motor drive method, the image capturing is performed without shifting the in-focus position from the in-focus position where focus detection is performed toward the closest side. However, in the same manner as in the case where the lens drive method is not the DC motor drive method, the image capturing may be performed by shifting the in-focus toward the closest side.

In the way described above, it is possible to perform image capturing in a depth range, where depth composition is desired, by shifting the in-focus position toward the closest side for an object whose front region is difficult to be focused when image capturing is performed. Further, it is possible to enhance perceived resolution in a region from the in-focus position to the closest side.

Embodiment 2

When the in-focus position is moved toward the closest side after the image capture plane phase difference AF is performed at the time of focus detection, the in-focus position is determined while blur determination is performed by an AF method different from the image capture plane phase difference AF such as, for example, TVAF. Thereby, the in-focus position may be set to an appropriate object position on the closest side. The in-focus position in this case will be described with reference to FIG. 9B.

Figure 9B:
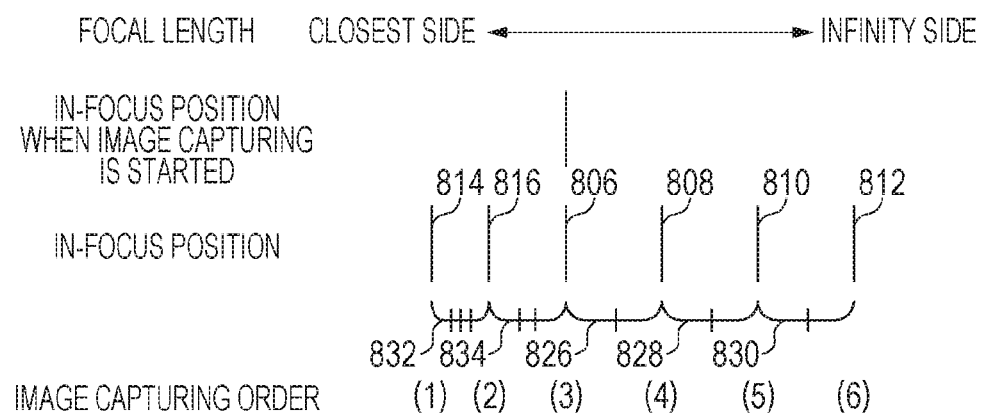

In FIG. 9B, only portions different from those in FIG. 9A will be described. The intervals from the in-focus position where the focus detection is performed by the image capture plane phase difference AF to the in-focus position on the infinity side are in accordance with the step width menu from the step width 826 to the step width 830. On the other hand, the intervals of the in-focus positions on the closest side, which are determined while blur determination is performed by TVAF, are step widths from the step width 832 to the step width 834. The step widths at this time are determined while blur determination is performed by TVAF, so that the step widths are intervals different from the step width menu. In-focus positions of an image to be captured are (1) to (6) sequentially located from the closest side to the infinity side.

By performing image capturing while the in-focus position is changed in this way, it is possible to generate a focused image from an in-focus position closer to the closest side than the position where the focus detection is performed during image capturing.

Hereinafter, an operation of an embodiment of the disclosure will be described with reference to FIG. 10.

Figure 10:
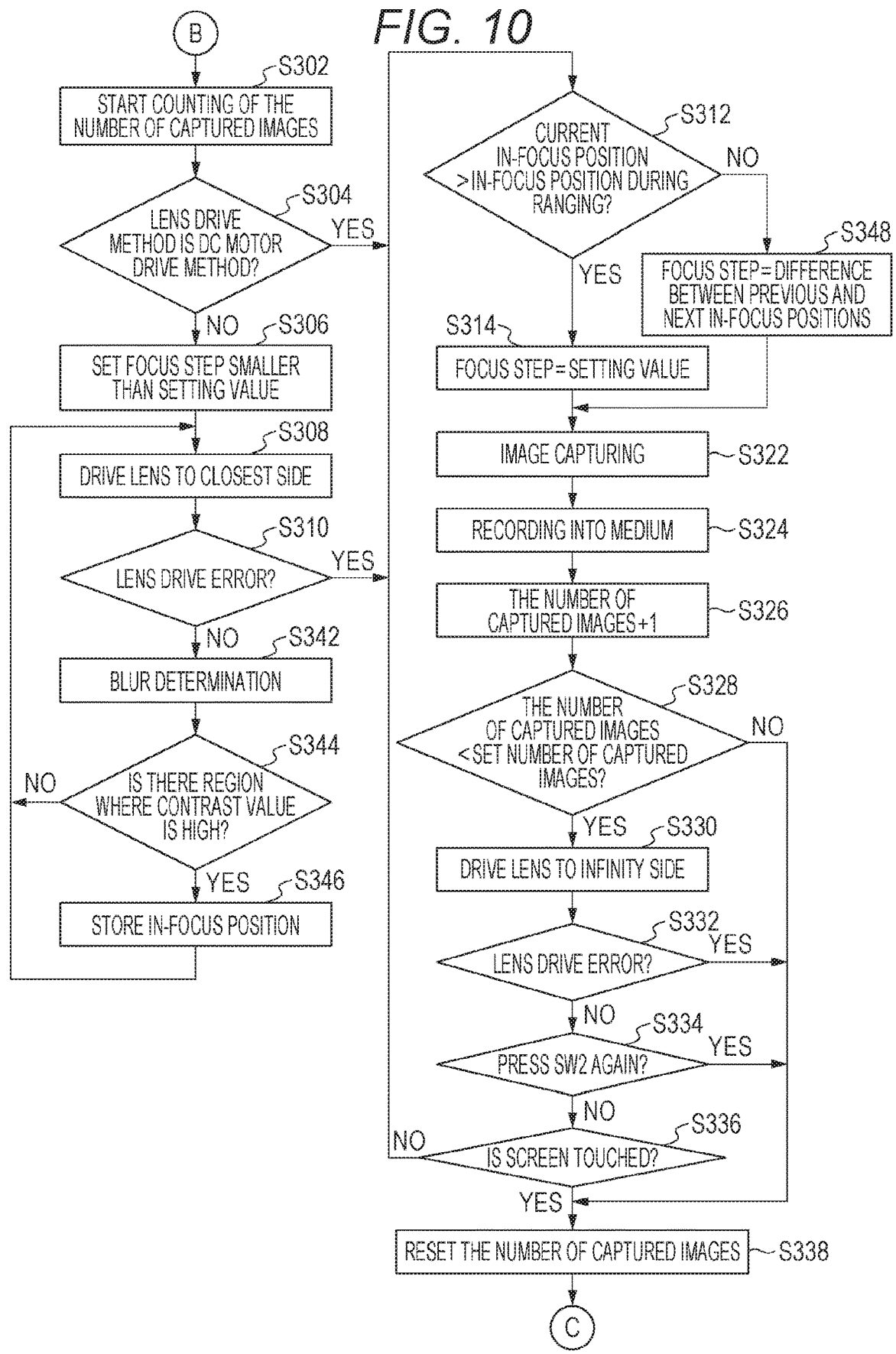
FIG. 10 is a flowchart showing image capturing mode processing in an embodiment 2 of the disclosure.

FIG. 10 is a flowchart of image capturing processing performed by the shutter button operation and the touch-down operation according to the present embodiment. In this flowchart, only portions different from those in the embodiment 1 will be described.

In S342, the TVAF focus detection unit 30 acquires a contrast value and performs blur determination.

In S344, the system control unit 50 determines whether there is a region where the contrast value is high and which is equal to or greater than a certain region as a processing result of S342. When there is a region where the contrast value is high and which is equal to or greater than a certain region, the processing proceeds to S346. Otherwise, the processing proceeds to S308. Thereby, it is possible to use an image including a region where the contrast value is high, that is, a focused region, as a material image for depth composition. As a result, also in this region, it is possible to generate a composite image with a perceived resolution by the depth composition.

In S346, the system control unit 50 stores an in-focus position into the system memory 52. The in-focus position stored here will be described with reference to FIG. 9B. The in-focus position is being fixed in order from an image capturing order (2) to an image capturing order (1). The in-focus position stored here is used to determine the image capturing order (1), the image capturing order (2), and the image capturing order (3), and an in-focus position 814, an in-focus position 816, and an in-focus position 806 where image capturing is performed, when the image capturing is started.

In S348, the system control unit 50 obtains a difference from the current in-focus position to the next in-focus position and assigns the difference as a focus step. The focus step here will be described with reference to FIG. 9B. The focus step is the step width 832 from the in-focus position 814 to the in-focus position 816 when image capturing of the image capturing order (1) is performed.

In this way, it is possible to perform image capturing according to an in-focus position determined while blur determination is performed by TVAF by the flow in FIG. 10. In S342, the blur determination is performed by using the TVAF focus detection unit 30. However, if there is another AF method that can perform blur determination, the AF method may be used.

In the way described above, it is possible to perform image capturing in a depth range, where depth composition is desired, by shifting the in-focus position toward the closest side for an object whose front region is difficult to be focused when image capturing is performed. Further, it is possible to enhance perceived resolution in a region from the in-focus position to the closest side.

Embodiment 3

A focusing accuracy at the time of focus detection may be loose depending on an object. Therefore, it is possible to compensate a precision error by performing image capturing by shifting the in-focus position toward the closest side by a step width of about the precision error. Here, the step width of about the precision error is defined as 1 of focus step setting. The in-focus position in this case will be described with reference to FIG. 9C.

Figure 9C:
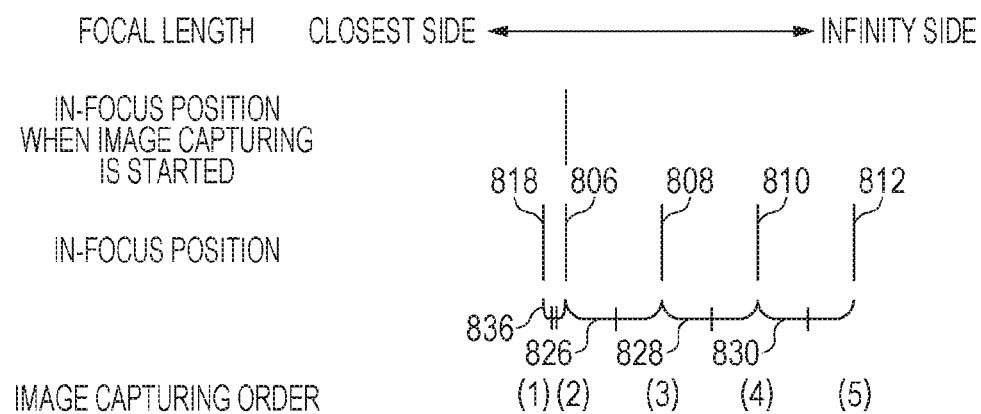

In FIG. 9C, only portions different from those in FIGS. 9A and 9B will be described. Intervals from the in-focus position where the focus detection is performed to the in-focus position on the infinity side are in accordance with a step width menu from the step width 826 to the step width 830. An interval from the in-focus position where the focus detection is performed to the in-focus position on the closest side is the step width 836. This is a step width that can compensate the precision error. In-focus positions of an image to be captured are (1) to (5)) sequentially located from the closest side to the infinity side.

By performing image capturing while the in-focus position is changed in this way, it is possible to generate a focused image from an in-focus position closer to the closest side than the position where the focus detection is performed during image capturing.

Figure 11:
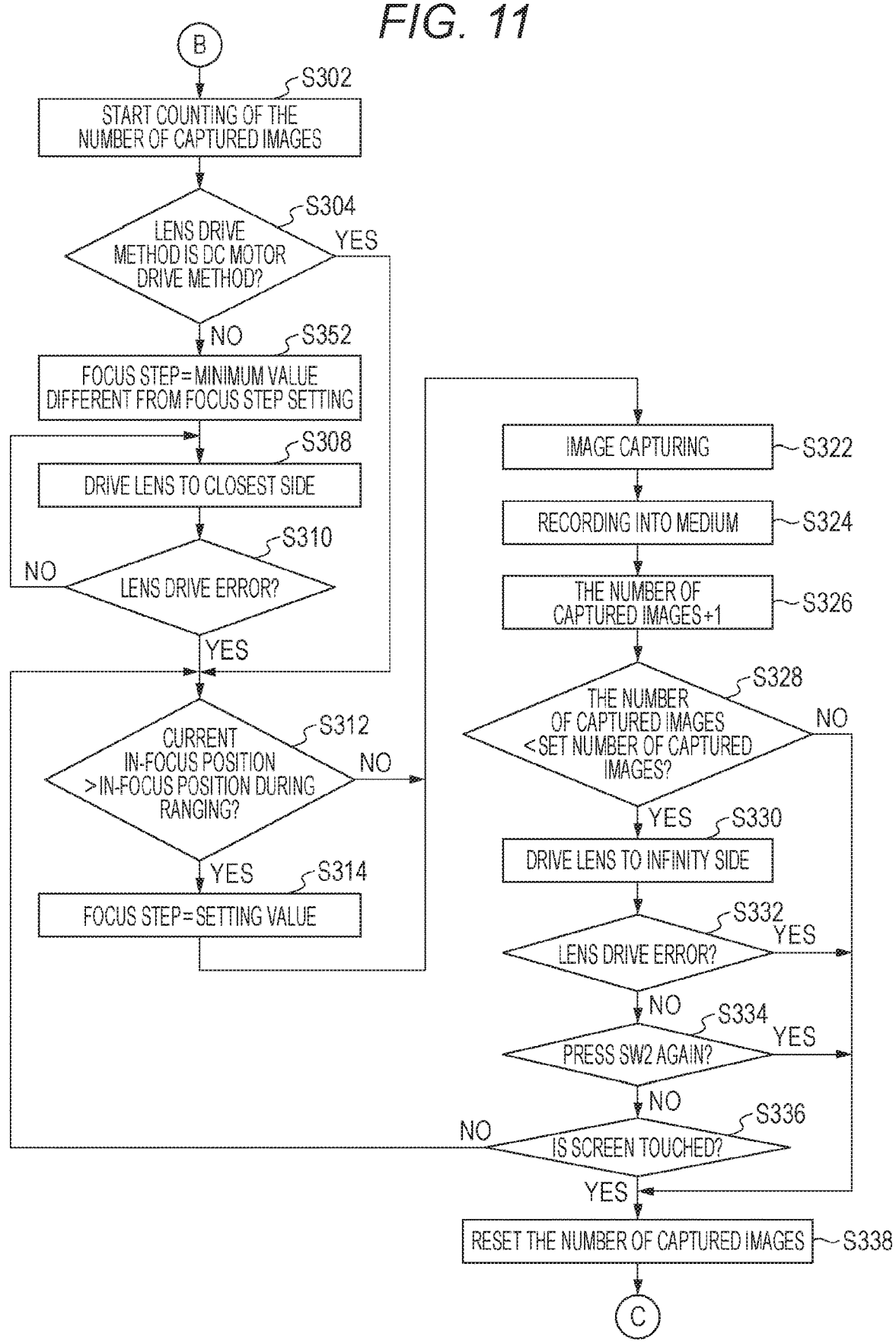
FIG. 11 is a flowchart showing image capturing mode processing in an embodiment 3 of the disclosure.

Hereinafter, an operation of an embodiment of the disclosure will be described with reference to FIG. 11. FIG. 11 is a flowchart of image capturing processing performed by the shutter button operation and the touch-down operation according to the present embodiment. In this flowchart, only portions different from those in the embodiment 1 and 2 will be described.

In S352, the system control unit 50 sets a minimum value different from the focus step setting to a focus step where the focus lens 104 is moved. When the focus step setting is 4, the system control unit 50 sets 1 as the minimum value, which is a step width of about the precision error. Thereby, it is possible to use an image that covers a range of about a focus precision error as a material image for depth composition. As a result, also in the range of about a focus precision error, it is possible to generate a composite image with a perceived resolution by the depth composition.

In this way, it is possible to perform image capturing by returning the in-focus position toward the closest side by a step width that can compensate the precision error. In S352, the minimum value 1 is set as a focus step. However, the focus step is not limited to 1 if the precision error can be compensated.

In the way described above, it is possible to perform image capturing in a depth range, where depth composition is desired, by shifting the in-focus position toward the closest side for an object whose front region is difficult to be focused when image capturing is performed. Further, it is possible to enhance perceived resolution in a region from the in-focus position to the closest side.

According to the embodiment described above, it is possible to provide an image capture apparatus that can acquire a focused image from an object whose front region is difficult to be focused.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the embodiment described above, a case where the disclosure is applied to a digital camera whose lens is detachable is described as an example. However, the disclosure is not limited to this example. That is, the disclosure can be applied to any device having an image capture element. The disclosure can also be applied to a digital camera and a video camera whose lens cannot be replaced. Further, the disclosure can be applied to apparatuses that can capture an image, such as a mobile phone terminal, a portable image viewer, a television set with a camera, a digital photo frame, a music player, a game machine, and an electronic book reader.

While the disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

This application claims the benefit of Japanese Patent Application No. 2018-126164, filed Jul. 2, 2018, which is hereby incorporated by reference herein in its entirety.

What is claimed is:

1. An apparatus comprising:
    a sensor having a plurality of pixels, each of which can photoelectrically convert light fluxes that have passed through different pupil regions of an optical system including a focus lens and output a pair of signals for focus detection;
    a memory device that stores a set of instructions; and
    at least one processor that executes the set of instructions to function as:
    a first focus detection unit that detects a focusing state based on an output from the sensor,
    a setting unit that sets a step width of a position of the focus lens,
    a control unit that controls to perform a plurality of times of image capturing based on the set step width,
    a display unit that displays an item for selecting a step width of the position of the focus lens for performing the plurality of times of image capturing,
    wherein, in a case where a user selects a step width, the setting unit sets a step width of the position of the focus lens based on the step width selected by the user using an in-focus position based on a result of the focus detection by the first focus detection unit as a reference, and wherein the setting unit sets a step width from the reference toward a closest side to a value smaller than a step width from the reference toward the infinity side.

2. The apparatus according to claim 1, further comprising:
a second focus detection unit that acquires a focus evaluation value indicating a contrast of an image based on an output from the sensor and performs focus detection based on the focus evaluation value; and
a determination unit that acquires the focus evaluation value and determines an in-focus position when an in-focus position moves in an image capturing from an in-focus position based on a result of focus detection by the second focus detection unit toward the closest side.

3. A method of an apparatus having a sensor having a plurality of pixels, each of which photoelectrically converts light fluxes that have passed through different pupil regions of an optical system including a focus lens and output a pair of signals for focus detection, the method comprising:
detecting a focusing state based on an output from the sensor;
setting a step width of a position of the focus lens;
controlling to perform a plurality of times of image capturing based on the set step width by the setting; and
displaying an item for selecting a step width of the position of the focus lens for performing the plurality of times of image capturing,
wherein, in a case where a user selects a step width, a step width of the position of the focus lens is set based on the step width selected by the user using an in-focus position based on a result of the focus detection as a reference, and
wherein a step width from the reference toward the closest side is set to a value smaller than a step width from the reference toward the infinity side.

4. The method according to claim 3, further comprising:
acquiring a focus evaluation value indicating a contrast of an image based on an output from the sensor and performing focus detection based on the focus evaluation value; and
acquiring the focus evaluation value and determining an in-focus position when an in-focus position moves in an image capturing from an in-focus position based on a result of focus detection by the acquiring a focus evaluation value indicating a contrast of an image toward the closest side.

5. A non-transitory computer readable storage medium storing a program of instructions for causing a computer to perform a method of an apparatus having a sensor having a plurality of pixels, each of which photoelectrically converts light fluxes that have passed through different pupil regions of an optical system including a focus lens and output a pair of signals for focus detection, the method comprising:
detecting a focusing state based on an output from the sensor;
setting a step width of a position of the focus lens;
controlling to perform a plurality of times of image capturing based on the set step width by the setting; and
displaying an item for selecting a step width of the position of the focus lens for performing the plurality of times of image capturing,
wherein, in a case where a user selects a step width, a step width of the position of the focus lens is set based on the step width selected by the user using an in-focus position based on a result of the focus detection as a reference, and
wherein a step width from the reference toward the closest side is set to a value smaller than a step width from the reference toward the infinity side.

6. The non-transitory computer readable storage medium according to claim 5, further comprising:
acquiring a focus evaluation value indicating a contrast of an image based on an output from the sensor and performing focus detection based on the focus evaluation value; and
acquiring the focus evaluation value and determining an in-focus position when an in-focus position moves in an image capturing from an in-focus position based on a result of focus detection by the acquiring a focus evaluation value indicating a contrast of an image toward the closest side.

* * * * *